United States Patent Office 2,724,101
Patented Nov. 15, 1955

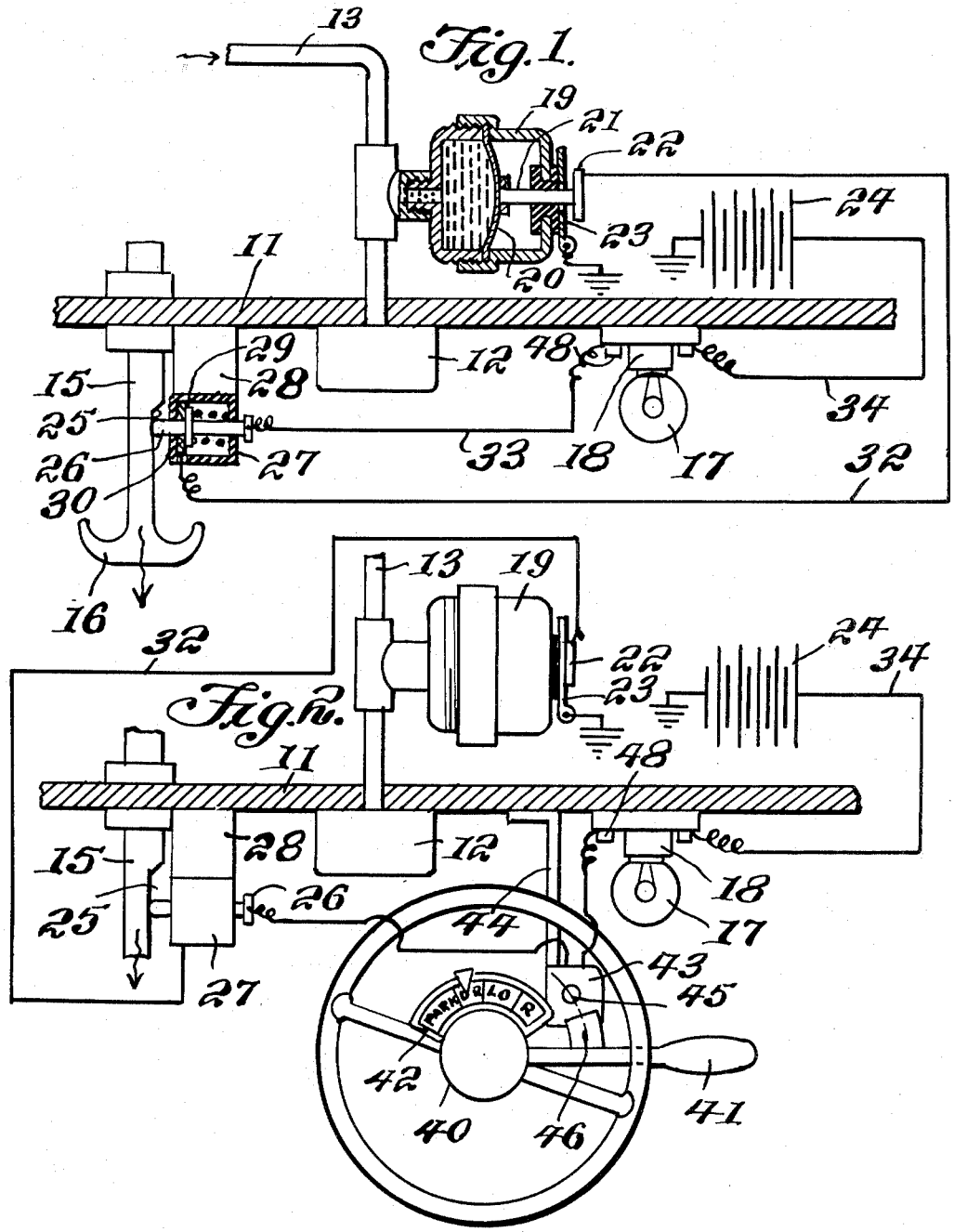

2,724,101

BRAKE SIGNAL

Haskell L. Hallman, West Columbia, S. C.

Application December 10, 1954, Serial No. 474,323

1 Claim. (Cl. 340—52)

This invention relates to warning devices for motor vehicles, and more particularly to a signal device to warn the operator of a motor vehicle to apply the hand brake of the vehicle when the vehicle is parked.

A main object of the invention is to provide a novel and improved warning device for motor vehicles to remind the vehicle operator to apply the hand brake of a vehicle when parking, the warning system involving simple components, being easy to install, and being reliable in operation.

A further object of the invention is to provide an improved electrical warning system for a motor vehicle to notify the vehicle operator when he fails to apply the hand brake of the vehicle or to place the automatic transmission control mechanism of the vehicle in "parking" position, when parking the vehicle, the improved warning system involving inexpensive components, requiring a minimum amount of maintenance, functioning also to provide a warning signal when the vehicle motor stalls or when there is an excessive drop in the oil pressure of the vehicle, creating no interference with the normal operation of other equipment of the vehicle, and serving to insure that the hand brake or other manually controlled braking means of the vehicle is applied when the vehicle is parked.

Further objects and advantages of the invention will become apparent from the following description and claim, and from the accompanying drawings, wherein:

Figure 1 is a horizontal fragmentary cross sectional view taken through a portion of the dashboard of a vehicle provided with an improved warning system according to the present invention, the electrical connections of the system being diagrammatically shown.

Figure 2 is a view similar to Figure 1 but showing a modified system according to the present invention installed on a vehicle provided with a manually controlled automatic transmission.

Referring to the drawings, and more particularly to Figure 1, 11 designates the dashboard of a motor vehicle, and 12 designates a conventional oil gauge mounted on the dashboard. Connected to the oil gauge 12 is the oil pressure line 13. Connected to the line 13 behind the dashboard is the pressure-controlled switch 19, for example of the diaphragm type. As shown in Figure 1, the diaphragm 20 of the switch is flexed to the right, as viewed in Figure 1, when the engine is in normal operation, the diaphragm 20 being provided with the insulating rod 21 which extends slidably and sealingly through the outer wall of the housing 19 and which carries a contact 22 at its outer end. The oil pressure-controlled switch 19 is provided with a stationary contact 23 which is engageable by the contact 22 when the pressure in the oil line 13 drops below a predetermined amount, as for example, when the engine of the vehicle is deenergized. Thus, when the engine stops or when the oil pressure in the line 13 is very low, the switch 19 will close. Otherwise, the switch 19 is open, as shown in Figure 1. As shown in Figure 1, the switch contact 23 is grounded, as is one terminal of the automobile battery 24.

Designated at 15 is the actuating member of the vehicle hand brakes, said actuating member being provided at its end with the handle portion 16, which may be pulled outwardly to apply the hand brakes. The actuating member 15 is provided with the cam portion 25 which is engageable with the plunger element 26 of a switch 27 mounted on a bracket 28 secured to the dashboard 11. Normally, when the hand brake is not applied, as shown in Figure 1, the switch 27 is closed. However, when the hand brakes are applied by pulling the handle member 16 outwardly, the plunger 26 is engaged by the cam element 25, causing the plunger-carried switch contact 29 to be disengaged from the stationary switch contact 30, opening the switch 27.

As shown, the stationary switch contact 30 is connected by a suitable wire 32 to the movable contact 22 of the pressure-controlled switch 19. The movable switch plunger 26 is connected by a wire 33 to one terminal of a lamp socket 18 mounted on the vehicle dashboard. The other terminal of the lamp socket 18 is connected by a wire 34 to the live terminal of the automobile battery 24, as shown.

Normally, when the engine is running, and there is normal oil pressure in the line 13, the switch 19 is open. Under normal operating conditions, the hand brakes are not applied, and therefore the switch 27 is closed. Thus, if there should be a failure of oil pressure, the switch 19 will close, and the lamp 17, mounted in the lamp socket 18, will be energized by a circuit comprising the live terminal of the battery 24, wire 34, socket 18, wire 33, switch 27, wire 32, switch 19 and ground. Similarly, when the vehicle is being parked, after the engine is shut off, the lamp 17 will be energized until the hand brake actuating member is pulled outwardly to apply the hand brakes. This provides a warning to the driver of the vehicle that the hand brakes are not applied, and thus assures that the driver will apply the hand brakes when parking the vehicle.

In the modification shown in Figure 2, 40 designates a conventional control mechanism for an automatic transmission employed on a vehicle, said mechanism comprising the control lever 41 which is employed to place the automatic transmission in its various positions, including the "parked" position, indicated at 42 on the control panel of the mechanism. Designated at 43 is a switch which is suitably mounted on a bracket 44 secured to the dashboard 11 and provided with an actuating button 45 engageable by a lug 46 carried on the control lever 41 when the control lever is moved into the "parked" position. In this position, the automatic transmission is effectively arranged as a braking means which will prevent rolling of the vehicle.

The switch 43 is normally closed and will be opened responsive to the actuation of the button 45 by the lug 46.

The circuit employed in Figure 2 is the same as in Figure 1 except that the switch 43 is connected in series with switch 27. Thus, the switch 43 is connected between the plunger 26 of switch 27 and a terminal 48 of the lamp socket 18, whereas in Figure 1, the plunger 26 is connected directly by the wire 33 to the terminal 48.

As in Figure 1 and the device of Figure 2, when the oil pressure is low, for example, when there is no oil pressure due to the deenergization of the vehicle motor, the switch 19 is closed and the lamp 17 will become energized and remain energized until either the vehicle hand brake is applied or the automatic transmission control lever 41 is moved into "parking" position. The energization of lamp 17 thus serves to notify the operator of the vehicle that neither the hand brake nor the automatic transmission is in braking position and that consequently in order to be safely parked, either the hand brake should be applied or the control lever 41 of the automatic transmission should be placed in the "parking" position.

As in the previously described form of the invention shown in Figure 1, a failure of oil pressure will cause the switch 19 to close in Figure 2 and will provide an indication of the reduction in oil pressure, assuming that the switches 27 and 43 are in their normal closed positions.

Obviously, any suitable signal device may be employed. Thus, if so desired a buzzer may be employed in place of the socket 18 and lamp 17, or may be employed together with said socket and lamp to provide an audible, as well as a visual warning signal.

While certain specific embodiments of an improved brake signal device for motor vehicles have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle having an internal combustion engine provided with a dashboard having an oil pressure gauge thereon, an oil pressure indicating line connected to said pressure gauge, an automatic transmission provided with a control mechanism having an operating lever selectively movable to a plurality of positions, including a parking position, and a hand brake, a signal circuit comprising a source of current, a pressure-controlled switch connected to said line, an additional switch operated by said hand brake, a normally closed additional switch mounted adjacent said operating lever and being engageable by said operating lever to open said last-named switch when the operating lever is in parking position, a signal lamp, and means electrically connecting said pressure-controlled switch, said additional switch, said last-named switch, said signal lamp, and said source of current in series, said pressure-controlled switch being opened when operating oil pressure is present in said line and closing in the absence of operating oil pressure, said additional switch being opened when said hand brake is in braking position and being closed when said hand brake is in released position, whereby said signal lamp will be energized when the hand brake is released with said operating lever in other than said parking position and when the oil pressure is below its operating value.

References Cited in the file of this patent

UNITED STATES PATENTS

| | | |
|---|---|---|
| 2,511,631 | Gordon | June 13, 1950 |
| 2,584,938 | Sweeny, et al. | Feb. 5, 1952 |
| 2,629,085 | Higgins | Feb. 17, 1953 |
| 2,634,400 | Sweet | Apr. 7, 1953 |